(12) United States Patent
McCoy et al.

(10) Patent No.: US 6,212,133 B1
(45) Date of Patent: Apr. 3, 2001

(54) LOW POWER GPS RECEIVER SYSTEM AND METHOD OF USING SAME

(76) Inventors: Kim McCoy, P.O. Box 191, Carmel, CA (US) 93921; David Jacobs, 11309 Porreca Point, San Diego, CA (US) 92126

( * ) Notice: Subject to any disclaimer, the term of this patent is extended or adjusted under 35 U.S.C. 154(b) by 0 days.

(21) Appl. No.: 09/360,789

(22) Filed: Jul. 26, 1999

(51) Int. Cl.[7] .............................. G04F 8/00; G04F 10/00; G01S 5/02; H04B 7/185
(52) U.S. Cl. .............................. 368/9; 342/357.12; 368/1
(58) Field of Search .................. 342/357.12, 357.06; 73/1.44; 702/89; 368/14, 1, 9, 10; 701/213

(56) References Cited

U.S. PATENT DOCUMENTS 5,883,594   3/1999   Lau .
5,905,460   5/1999   Odagiri et al. .

Primary Examiner—Thomas H. Tarcza
Assistant Examiner—Fred H. Mull

(74) Attorney, Agent, or Firm—Jerry R. Potts

(57) ABSTRACT

A new and improved low power GPS signal receiver system includes a GPS signal receiver device and control processor for powering up the signal receiver device for a first sufficient period of time to locate and acquire a time signal from a single GPS satellite and then powering down the GPS signal receiver device after establishing a local time and for waiting another sufficient period of time after receiving a user request to update time before powering up the signal receiver device to facilitate about an immediate sync on another GPS navigation message subframe indicative of the time maintained by said single GPS satellite vehicle. Once the second sufficient period of time has elapsed, the control processor powers up the GPS signal receiver device for a third sufficient period of time to acquire and process 29 bits of subframe message information indicative of time maintained by the GPS satellite vehicle. Once the time maintained by such a single GPS satellite vehicle has been obtained and processed, the control processor powers downs the GPS signal receiver device to a low power standby mode to wait for another user request to update time.

24 Claims, 6 Drawing Sheets

LOW POWER GPS RECEIVER SYSTEM AND METHOD OF USING SAME

TECHNICAL FIELD

The present invention relates in general to a Navigation System with Timing and Ranging (NAVSTAR) Global Positioning System (GPS) and method of using such a system. The invention more particularly relates to a low power GPS signal receiver system and method of using such a system for determining time and positioning information.

BACKGROUND

GPS was developed as a ranging system to determine unknown positions on land, sea, in air and space based on the known positions of a constellation of 24 satellites in 6 orbital planes. The orbital planes, each having 4 satellites positioned therein, are inclined at 55 degrees with their ascending nodes each being separated by 60 degrees. In this regard, each one of the GPS satellites travels in a semi-synchronous circular orbit around the air space above the surface of the earth. The orbits traveled by each satellite are broadcast and superimposed on a set of GPS pseudorandom noise codes and are available to obtain precise ephemerides after post-processing. A conventional GPS receiver, tuned to receive the GPS pseudorandom noise codes, converts the codes into time, position and velocity estimates that are sufficiently accurate for navigation, positioning and time dissemination.

Each one of the GPS satellites transmits its pseudorandom noise codes on two basic frequencies using on an board atomic clock that produces a fundamental L-band frequency of 10.23 MHz. Using carrier frequencies generated by multiplying the fundamental frequency by 154 and 120 respectively, the two basic frequencies of 1575.42 MHz and 1227.60 MHz are formed to carry two pseudorandom noise codes. The two pseudorandom noise codes are superimposed on the basic carrier frequencies along with other satellite emphemerides such as status information, system time, and satellite clock corrections. The measured travel time of the signals traveling from each satellite is then utilized by a GPS receiver to compute pseudoranges and time. In summary then, the use of the Global Positioning System to provide position and precise timing information is well known in the prior art.

While the use of GPS to provide position and precise timing information is well known in the prior art such GPS receivers for most part consume large amounts of energy and thus, have found limited portable use.

One attempt at solving the problems associated with power consumption is disclosed in U.S. Pat. No. 5,883,594 by Chung Y. Lau, entitled "GPS Receiver Using a Message System for Reducing Power Consumption." The Lau patent describes a GPS message system including a GPS base station for receiving GPS signals and providing GPS acquisition and location information and a message system manager for transmitting a radio message signal including a wakeup call and GPS information. In this regard, a message transceiver receives the radio message signal and passes the wakeup call and GPS information to the GPS receiver having a low power standby mode. The GPS receiver awakes from the standby mode and enters an operational mode for using the GPS information for acquiring the GPS signal and deriving a first location fix.

While such a system may be satisfactory for some applications, the Lau system is not entirely satisfactory as it requires large bulky secondary equipment to transmit the wakeup call and GPS information to the low power GPS receiver.

Therefore it would be highly desirable to have a new and improved low power GPS receiver system that enters into an operational mode without the use of a secondary radio transmission signal and that operates to provide precise timing information in a fast and convenient manner.

Another attempt at solving the problems associated with power consumption are disclosed in U.S. Pat. No. 5,905,460 by Odagiri, et al. entitled "Wrist Watch Type GPS Receiver." The Odagiri et al. patent discloses a GPS system that includes an antenna posture detecting device for detecting an antenna posture condition and a receiving signal operation controlling device for temporarily interrupting the GPS wave receiving operation when it is impossible for the system antenna to receive the GPS wave. The receiving signal controlling device interrupts the GPS wave receiving operation until the GPS wave receiving operation is again possible. In this manner, the operation of the GPS receiver is interrupted preventing large power losses when the GPS wave can not be received properly.

While such a system may be satisfactory for some applications, the Odagiri, et al. system is not entirely satisfactory as it requires an antenna posture detecting device as well as a moving distance calculating device for calculating a moving distance of the user to correct for that period of time when the GPS signal receiving operation is interrupted.

Therefore it would be highly desirable to have a new and improved low power GPS receiver system that operates to provide precise time information without interrupting normal operations and without the use of special antenna posture detecting or moving distance calculating devices.

DISCLOSURE OF THE INVENTION

A new and improved low power GPS signal receiver system includes a GPS signal receiver device and control algorithm for powering up the signal receiver device for a sufficient period of time to receive a single GPS navigation message subframe indicative of the time maintained by a single GPS satellite vehicle. Once the time maintained by such a single GPS satellite vehicle has been obtained, the GPS signal receiver device processes the subframe and powers down to a low power standby mode of operation where the updated time is displayed for easy visualization by a user.

BRIEF DESCRIPTION OF THE DRAWINGS

The above mentioned features of the invention and the manner of attaining them will become apparent, and the invention itself will be best understood by reference to the following description of the embodiments of the invention in conjunction with the accompanying drawings wherein.

DETAILED DESCRIPTION

Description of the Preferred Embodiment(s)

Figure 1:
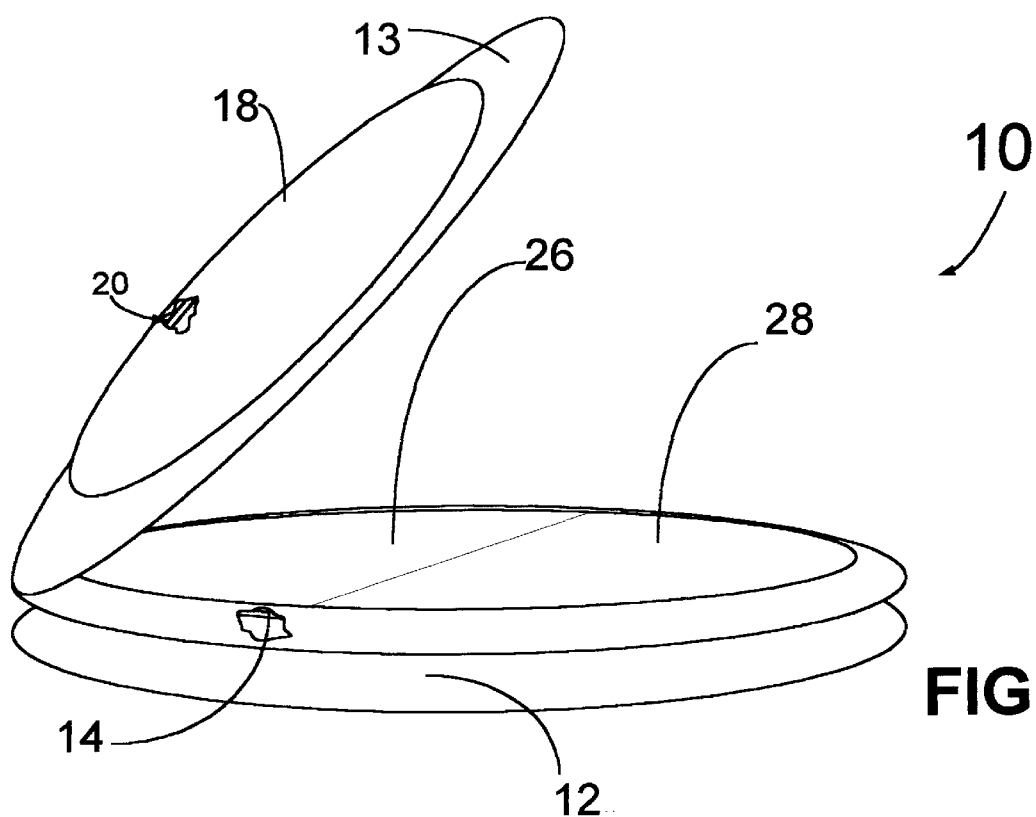
FIG. 1 is a pictorial view illustrating operative elements of a low power GPS signal receiver system, which is constructed in accordance with the present invention.

Referring now to the drawings and more particularly to FIG. 1 thereof, there is illustrated a low power operated GPS signal receiver system 10, which is constructed in accordance with the present invention. The GPS signal receiver system 10 enables a user to accurately determine time at any location on land, sea, in air or space in accordance with a novel time determination method of the present invention.

The GPS signal receiving system 10 is shown in the preferred embodiment as a watch that accurately determines time and position information. Those skilled in the art however will understand that the form of the system 10 is not critical to the invention. In this regard, the system 10 may be in the form of a wrist watch, a pendant, a wall mountable clock or a desk clock. There is therefore no intention of limiting the present invention to any specific form.

The GPS signal receiver system 10 generally includes an encasement 12 for supporting therein of a time and position calculating device 14 and a two dimensional GPS antenna 20. The antenna 20 as best seen in FIG. 1, is shown disposed in a glass crystal 18 for a protective closure lid 13 that is removably mounted to a face portion of the encasement 12. As will be explained hereinafter in greater detail, the antenna 20 is a thin wire loop antenna that may be disposed on a substrate configured in any desired shape. Thus for example, the substrate could be circular in form in order to mount the antenna at the peripheral boundary area of the encasement 12 as opposed to within the crystal 18.

Figure 3:
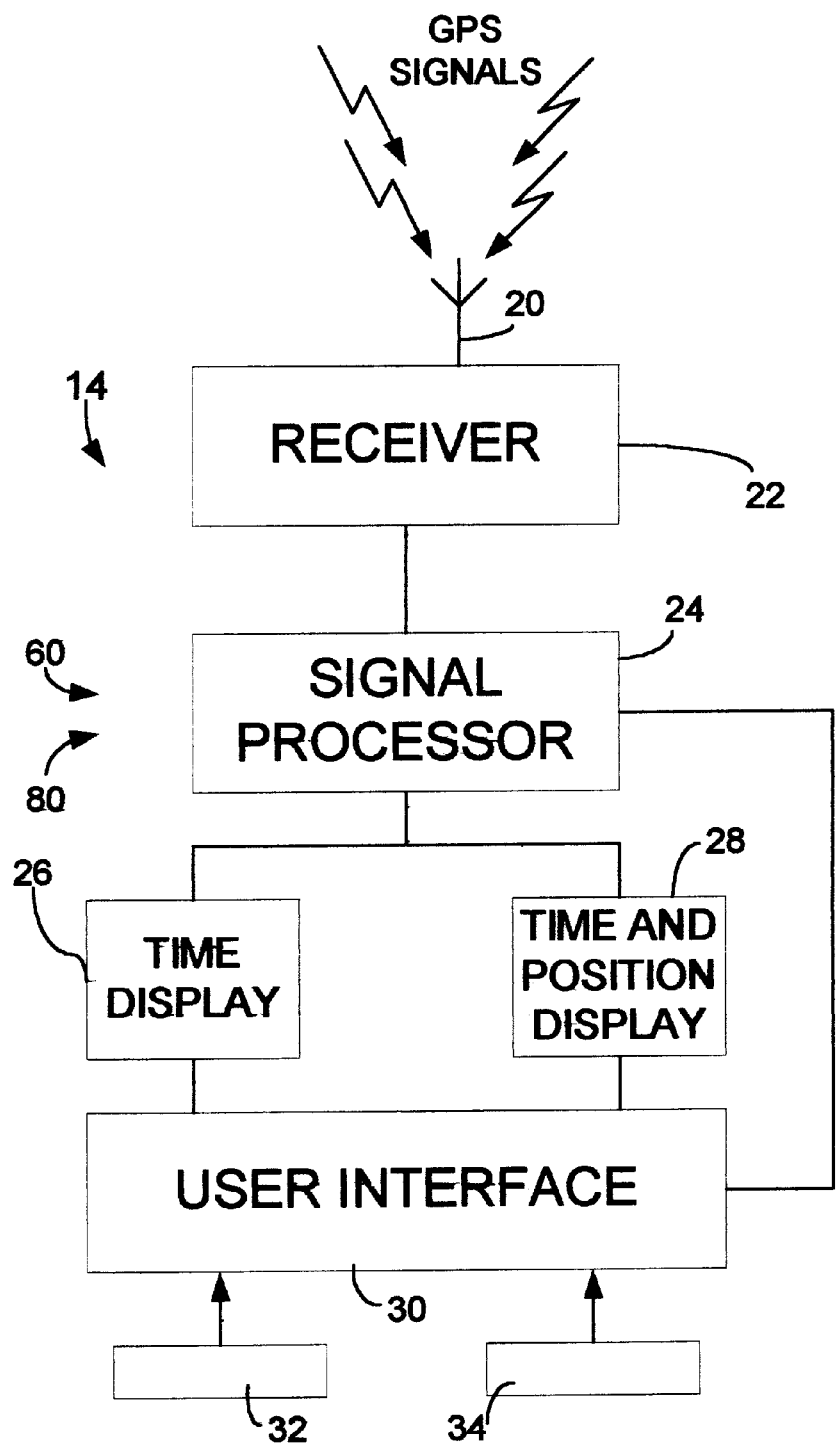
FIG. 3 is a block diagram of a time and position calculating device forming part of the GPS signal receiver system of FIG. 1.

Considering now the time and position calculating device 14 in greater detail with reference to FIG. 3, the time and positioning calculating device 14 generally includes a GPS receiver 22 that is coupled to the GPS antenna 20. The GPS receiver 22 and antenna 20 cooperate to provide position and time information as will be explained hereinafter in greater detail in accordance with the novel time determination method of the present invention.

In order to facilitate calculating a GPS-derived geographical location fix and time, the time and positioning calculating device 14 also includes a low power high speed processor 24 that coupled between the receiver 22 and a pair of display devices 26 and 28 respectively. The display device 26 is a time only display device while the display device 28 is a time and position display device. A user interface 30 is coupled between the display devices 26 and 28 and the processor 24 to enable a user to select the operating modes of the GPS signal receiver device 10. In this regard, the GPS signal receiver device 10 has four modes of operation:

1. a compute time only mode of operation;
2. a compute time and position mode of operation;
3. a standby low power display time mode of operation; and
4. a standby low power display time and position mode of operation.

The standby low power display time only mode of operation is a default mode of operation permitting a user to utilize the system 10 to update local time and visualize time and position information on the display devices 26 and 28 respectively.

In order to facilitate the changing of the operation modes and to request a time update, the user interface includes a mode selection switch or button 32 and an acquire time switch or button 34 as best seen in FIG. 3. In this regard, the control processor 24 responds to the actuation of the interface switches 32 and 34 respectively by executing in the compute time only mode of operation a time only control process or algorithm 60 and by executing in the compute time and position mode of operation a time and position control process or algorithm 80. The respective control processes of the GPS signal receiver system 10 will be explained hereinafter in greater detail. It should be noted however, that when the system 10 is in the time and position mode of operation, the switch 34 also initiates the time and position algorithm 80.

Before discussing the control processes 60 and 80 in detail, it may be beneficial to briefly review the basic operation of the Global Positioning System. The GPS is funded and controlled by the U.S. Department of Defense. The GPS constellation of satellites provides coded satellite signals which when processed by a conventional GPS receiver system provides geographical position, velocity and time information. Typically, data from at least three satellite signals are processed simultaneously to provide position information. The GPS satellites' orbital planes are inclined relative to the equatorial plane of the Earth. The satellites orbit the Earth approximately every twelve hours. An any one given time there are between five and eight satellites visible from any point on the global surface of the Earth.

Each satellite transmits two microwave signals, an unmodulated L1 signal at 1575.2 MHz and an unmodulated L2 signal at 1227.60 MHz. The L1 and L2 signals are both multiples of the GPS fundamental frequency of 10.23 MHz.

In order to provide information about time, velocity and position, two pseudorandom noise codes, known as a Course Acquisition or C/A code and a Precise or P code, are utilized to modulate the L1 and L2 signals.

The L1 signal is also modulated by a navigation message signal that is a 50 Hz signal that consists of data bits that describe the orbit of the transmitting satellite, clock correction information, and certain other system parameters utilized in determining position information. More particularly, a complete navigation message consists of twenty five frames or one hundred and twenty five subframes of information that is transmitted in about 12.5 minutes. Each frame of the navigation message consists of 1500 binary bits that is repeatedly transmitted every 30 second. Each frame is divided into five subframes of 300 bits of information where each subframe has a six second duration. Table I indicates in order the subframes and the information carried in each subframe.

TABLE I

| Subframe Sequence Number | Information Carried |
| --- | --- |
| No. 1 | Clock data parameters |
| No. 2 | Ephemeris data parameters |
| No. 3 | Ephemeris data parameters |
| No. 4 | System data |
| No. 5 | System data |

The clock data parameters describe the satellite vehicle clock and its relationship to GPS time. This is sometimes call SV time and is the time maintained by the satellite vehicle. The ephemeris data parameters describe the satellite vehicle orbit and such parameters are utilized with conventional algorithms to compute the position of the satellite for any time within the period of orbit described by the ephemeris parameters.

The above-mentioned satellite information typically must be processed in a very short period of time when received. Such processing generally requires significant processing power and electrical energy. Thus, in most GPS systems a high clock rate digital signal processor operates during a typical data acquisition period to accomplish such processing. As mentioned, such a processor consumes a significant amount of power during the data acquisition period.

Figure 2:
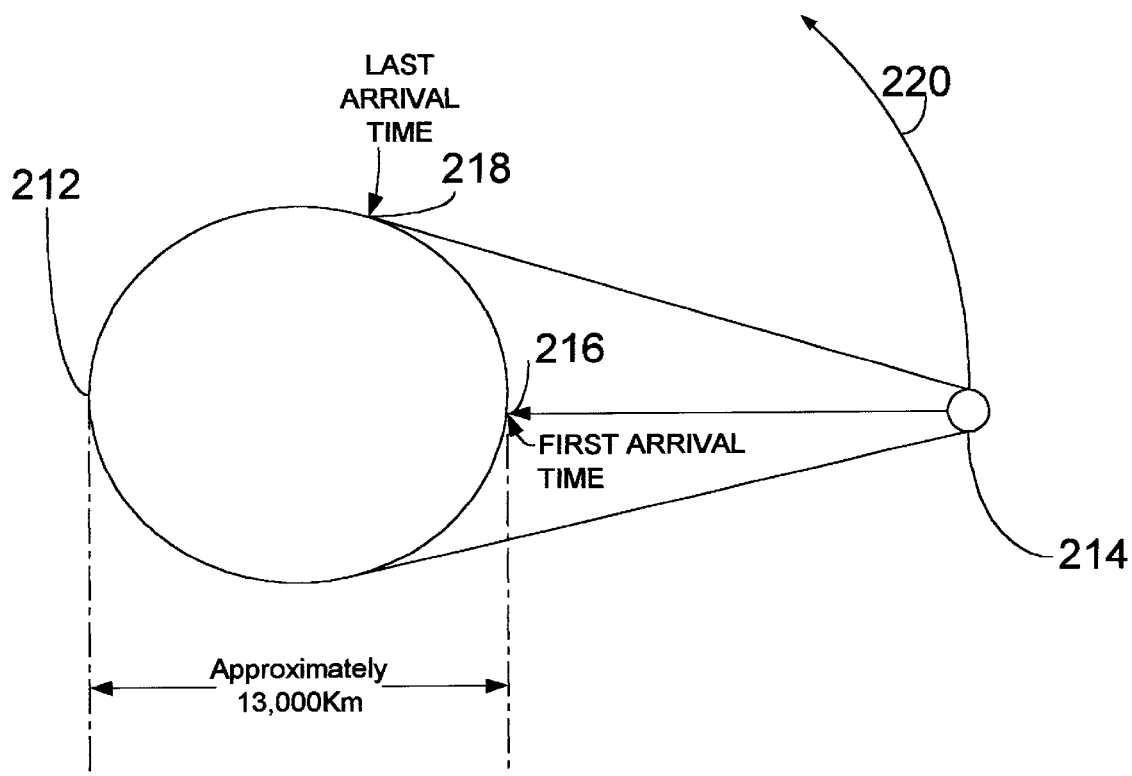
FIG. 2 is a diagrammatic illustration showing the arrival of a modulated data signal transmitted from a GPS satellite orbiting the Earth in a fixed orbital path.

As best seen in FIG. 2, each GPS satellite, such as a satellite 214, orbits the Earth in a fixed orbit 220 at approximately 10,000 kilometers from Earth's surface 212. Accordingly, the signal propagation time at a closest GPS receiver position 216 on the global surface 212 is approximately 0.03 seconds. This is sometimes referred to as "a first arrival time". In a similar manner, the signal propagation time to a farthest GPS receiver position 218 on the global surface 212 is approximately 0.052 seconds. This is sometimes referred to as "a last arrival time". From the foregoing, it will be understood by those skilled in the art that signal propagation delay, without considering ionosperic and atmospheric delays is between about 0.03 seconds and about 0.052 seconds.

Considering now the computation of time in greater detail, time is provided relative to three primary references. The first reference is SV time, which is the time maintained by each satellite vehicle. The second reference is GPS time, which is the time maintained by ground control stations for all of the GPS satellite constellation, and the third reference is Universal Time Coordinated time which is the time at a GPS receiver. UCT time is computed from GPS time using the UCT correction parameters that are sent as part of the navigation message.

Considering now GPS time in greater detail, GPS time is maintained in weeks and seconds from a fixed base period that is currently 24:00:00, Jan. 5, 1980. As mentioned, GPS time is maintained by the ground control stations in the NAVSTAR system and thus is utilized periodically to assure that each of the satellite vehicles are tuned to within 1 millisecond of GPS time. The clock correction parameters transmitted by each satellite vehicle reflects the offset of SV time from GPS time.

Figure 6:
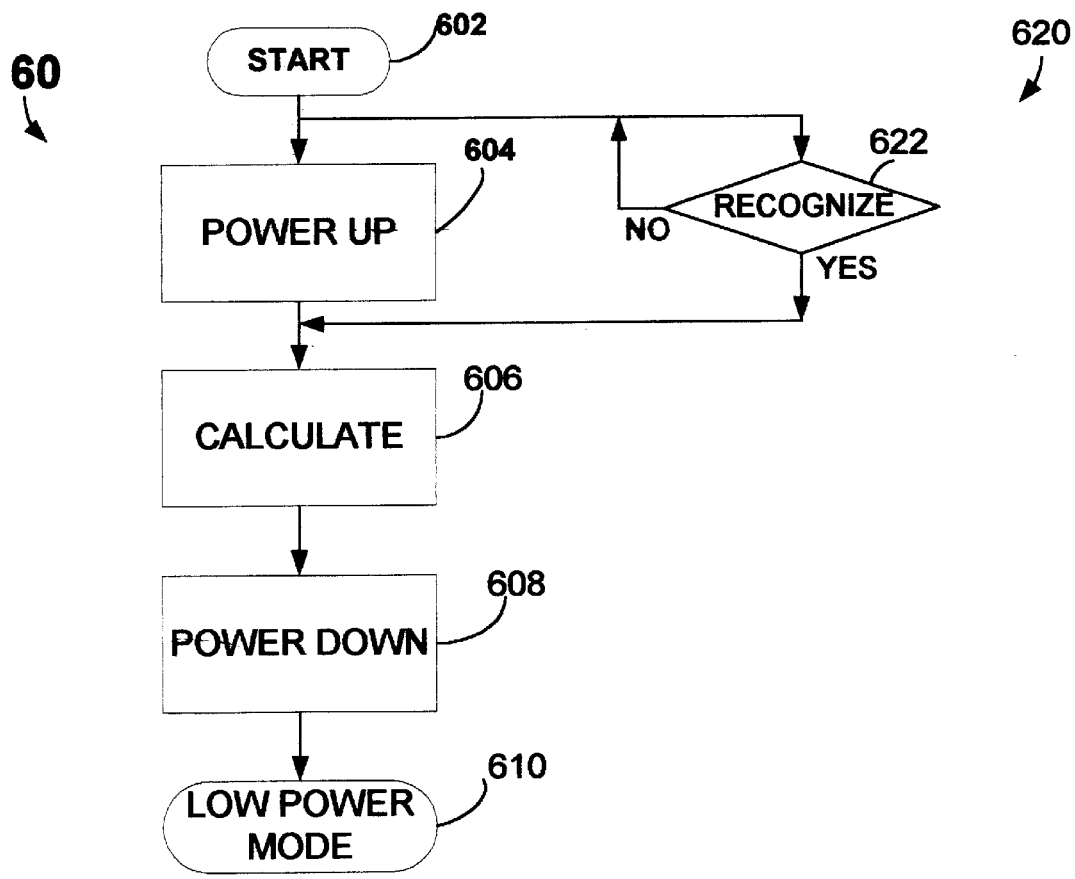
FIG. 6 is a flow chart of a time only algorithm for controlling the operation of the GPS signal receiver system of FIG. 1.

Considering now the operation of the GPS receiver system 10 in greater detail with reference to FIG. 6, it should be noted that the celestial position of any individual satellite is unimportant for a time solution with an accuracy of the order of 0.10 seconds. That is, it is only important to acquire the time frame sync from any satellite, regardless of the position of that satellite for a solution of low accuracy time. In this regard, the acquisition of time is only a very small fraction of the total information content of a GPS signal. Thus, while the knowledge of precise time is fundamental to the determination of a geographical position, when time alone is desired there is no need for such precise time.

Figure 4:
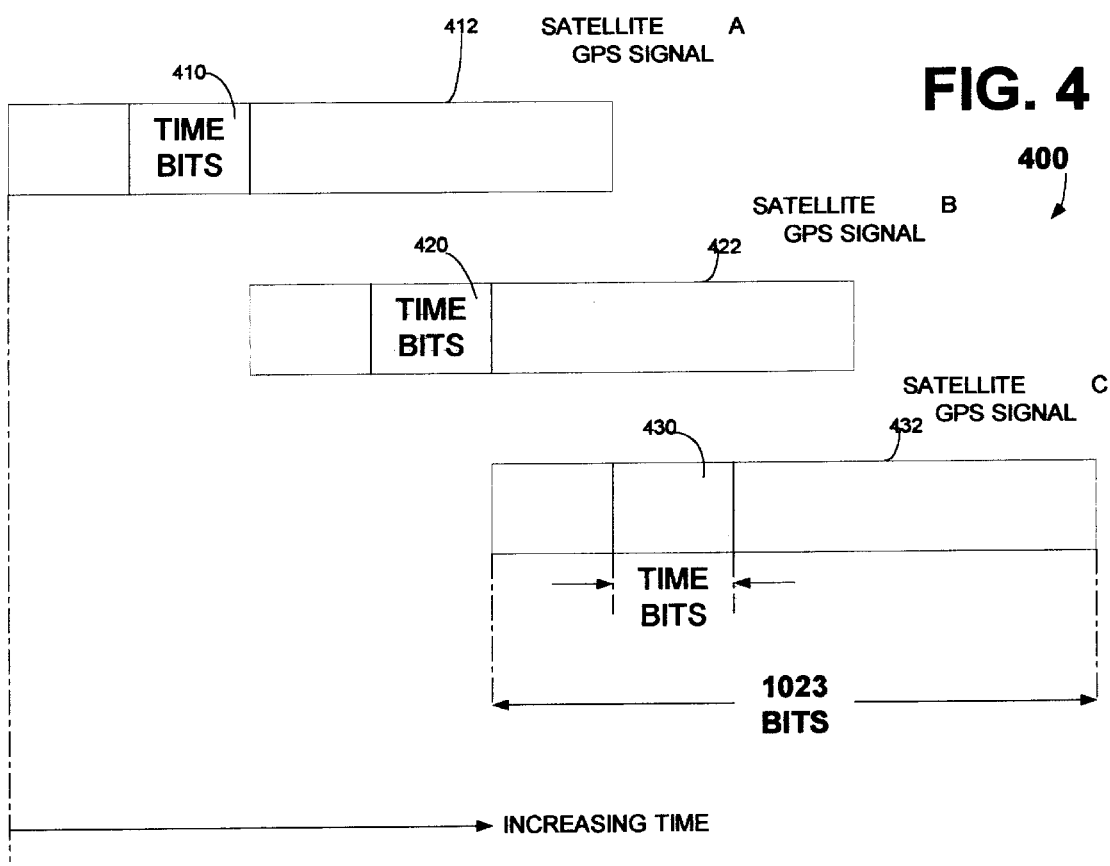
FIG. 4 is a diagrammatic illustration showing the arrival of modulated data signals transmitted from a plurality of GPS satellites orbiting the Earth in different orbital paths.

In operation then, the time only control process is initiated from a start command 602 whenever a user presses the acquire time button 36 on the user interface 30. If the system 10 has not previously acquired time, the control process 60 proceeds to a power up command 604 that enables the GPS receiver 22 and the time and position calculating device 14 to acquire at least one six-second frame sync (or subset thereof) from any satellite. Thus, as best seen in FIG. 4, the device 14 need only acquire the times bits 410, 420, or 430 from an individual one of the satellites A, B or C respectively without reference to the celestial position of the satellite. Moreover, there is no need to acquire a full GPS message as the data subframe containing time is repeated at six second intervals. The acquired time as well as the satellite empheris are stored in a storage device (not shown) associated with the processor 24. The storage of the satellite empheris at the acquired time enables the processor 24 to determine with a certain degree of certainty when to acquire a time update from the same satellite as will be explained hereinafter in greater detail. In any event, once time has been acquired and stored, the control algorithm 60 immediately powers down to the standby mode to wait for the user to once again activate the acquire time only switch 34. In short then, the novel method of computing time only necessitates the processing of data from only a single satellite in the GPS satellite constellation and requires at most only about six seconds of time to acquire and process the time relevant time for initial time acquisition purposes.

If the system 10 has previously acquired a GPS navigation message from one of the GPS satellites, the control processor 24 responds to the activation of the acquire time switch 34, using its previously acquire time to sync on the GPS navigation message by waiting a sufficient period of time (estimated by the processor 24 using its internal clock) to power up the system at such a time to be able to acquire a next series of time bits from the known GPS satellite. Once the sync period has occurred, the processor 24, under the control of the control process 60, executes the power up command 604 to power up the GPS receiver 22 only for a sufficient time to locate the GPS satellite signal and acquire the next occurring data subframe containing time.

Those skilled in the art will appreciate that once the control processor 24 knows this sync time period, the controller processor 24 can activates the GPS signal receiving device 22 at a time to acquire a next occurring time data subframe. In short then, those skilled in the art will then appreciate that the controller processor 24 will know the precise time to wake up the GPS signal receiving device 22 to acquire such a time data subframe from the identified GPS satellite. Such a sufficient period of time is between about 0.03 seconds and about 4.3 seconds depending upon the time that the user activates the acquire time switch 34 and the location of the user relative to the last occurrence when time was acquired.

Once a data subframe containing time has been acquired, the time only control process 60 proceeds to a calculate command 606. The calculate command 606 causes the signal processor 24 to process the converted information from the receiver 22 into time information that is set in the time display device 26. After setting the calculated time information in the time display device 26, the control process 60 advances to a power down command 608 that powers down the GPS receiver 22 and the signal processor 24 placing the GPS signal receiver device in a standby low power mode of operation for the displaying of time only.

As mentioned earlier, the data subframe containing time is repeated at six second intervals. Each data subframe, such as the subframe 410 for example, contains the following information:

1. nine bits of week number information; and
2. twenty bits of second information indicative of the number of seconds that have elapsed since the start of the week.

In total then, only 29 bits of time frame information from a single satellite is necessary to obtain an accurate GPS time.

It should also be understood by those skilled in the art, that if the GPS signal receiver device 10 already has stored therein a current week number, then only the twenty bits indicative of the number of seconds from the start of the week need be acquired. In this regard, the time only control process 60 includes a subroutine 620 that is initiated at the start command 602. The subroutine 620 examines the data bit stream from the GPS receiver 22 to determine at a decision step 622 whether there is a comparison in the specific week sequence of bits with the current week bits stored in the memory of the signal processor 24. If there is a comparison, the subroutine 620 causes the control process to immediately skip to calculate command 606 without waiting until the beginning a Z count data subframe having a six second duration. Thus, by recognizing the significance of the seconds bitstream, and only processing this portion of the GPS message, further energy is saved.

In summary then, the GPS signal receiver device 10 is able to accomplish the following tasks in a fast and efficient manner while consuming low amounts of power:

1. the ability to process data from only one satellite for a time only solution;
2. the ability to process only the time relevant portion of the acquired data stream;
3. the ability to process only the seconds portions of the acquired data stream;
4. the ability to recognize the repeated portions of a GPS message;
5. the ability to recognize entire messages from multiple satellites to then compute a geographical position;
6. the ability to look at only one carrier frequency, either L1 or L2;
7. the ability to predict when the next data acquisition should occur and delay higher energy usage until a higher probability of acquisition will occur;
8. the ability to increase time accuracy by processing more messages;
9. the ability to use a lower quality antenna with less energy usage to acquire data;
10. the ability to increase time accuracy based on a stored ephemeris;
11. the ability to provide a globally available time base with low energy usage; and
12. the ability to truncate operations to conserve power based on time accuracy requirements.

Figure 5:
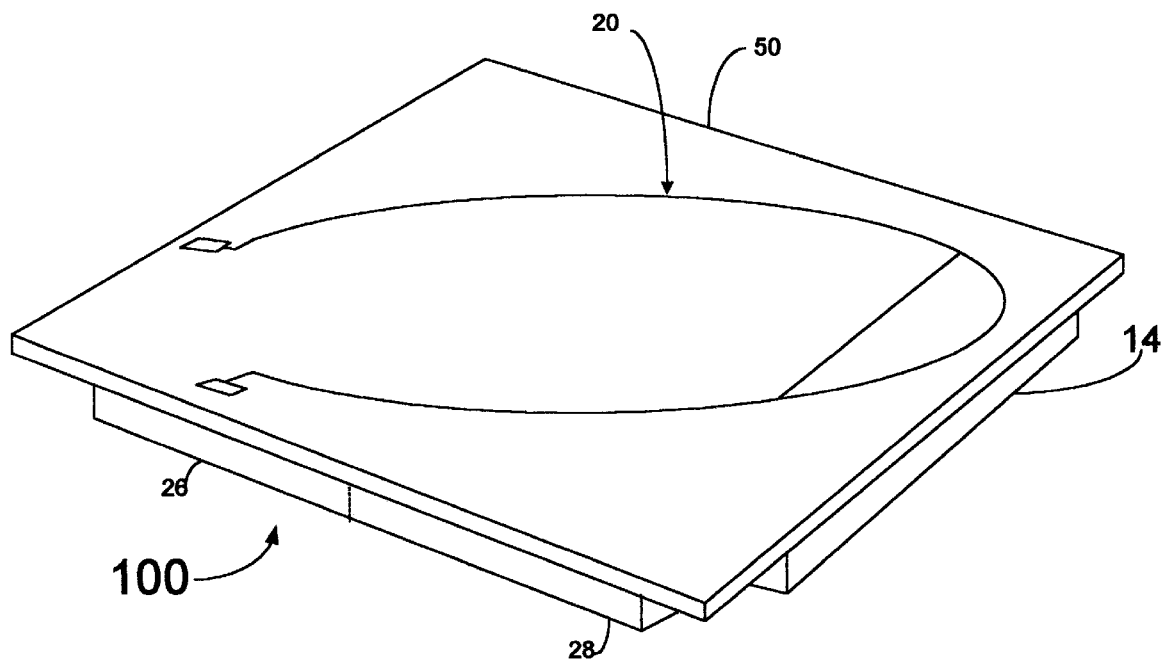
FIG. 5 is pictorial view of an application specific integrated circuit and antenna implementing the time and position calculating device of FIG. 3.

Referring now to the drawings and more particularly to FIG. 5 thereof there is illustrated another GPS receiver system 100 which is constructed in accordance with the present invention. The GPS receiver system 100 is substantially similar to the GPS receiver system 10 and includes a substrate 50 having mounted thereon a time and positioning calculating device 14 implemented in the form of an application specific integrated circuit 14, a pair of micro display devices 26 and 28 respectively and a wire loop antenna 20 coupled to the device 14. The GPS receiver system 100 operates substantially in the same manner as the GPS receiver system 10.

It should be understood by those skilled in the art that the substrate 50 can be configured in any desired form. In this regard, the substrate could be configured to the shape of the encasement 12 as illustrated in FIG. 1 so as to allow the antenna 20 to be mounted adjacent to the peripheral boundary of the encasement 12. In this manner, signals transmitted from a GPS satellite to the antenna 20 would be substantially unobstructed since all the electronics are mounted to the underside of the substrate 50 while the antenna 20 is mounted on the upper side of the substrate 50.

Considering now the time and position control process or algorithm 80 in greater detail, it will be understood by those skilled in the art, that the method of activating and deactivating the GPS signal receiving device 22 in the time only mode can be extended to acquire GPS data signals from two or more GPS satellite in order to determine position information. As the methods of acquiring such data and processing such data for determining position are well known to those skilled in the art, such a time and position control process will not be described hereinafter in greater detail.

While the present invention has been described with regard to particular embodiments, it is recognized that additional variations of the present invention may be devised without departing from the inventive concept.

We claim:

1. A method of determining a Universal Coordinated Time value, comprising:
   activating a GPS signal receiver device to a full power mode of operation for a sufficient period of time to acquire only one subframe of a GPS navigation message indicative of time correction parameters;
   processing the acquired one subframe of said GPS navigation message to update and display a current Universal Coordinated Time value; and
   deactivating said GPS signal receiver device to a low power standby mode of operation until such time as a user desires to further update the current Universal Coordinate Time value.

2. A method according to claim 1, wherein the acquired one subframe of said GPS navigation message is acquired from a single GPS satellite.

3. A method according to claim 2, wherein the acquired one subframe of said GPS navigation message is only indicative of time in seconds.

4. A method according to claim 2, wherein the acquired one subframe of said GPS navigation message is only indicative of time in weeks and seconds.

5. A method according to claim 1, wherein said sufficient period of time is truncated when the subframe includes a specific week sequence of bits that corresponds to a current week sequence of bits stored in said GPS signal receiver device.

6. A method according to claim 5, wherein said sufficient period of time is less than six seconds in duration.

7. A method according to claim 1, wherein said sufficient period of time is about six seconds in duration.

8. A method according to claim 1, further comprising:
   activating said GPS signal receiver device to a full power mode of operation for another sufficient period of time to acquire only another single subframe of a GPS navigation message indicative of time correction parameters;
   processing the acquired another subframe of said GPS navigation message to update and display another current Universal Coordinated Time value having an increased accuracy; and
   deactivating said GPS signal receiver device to a low power standby mode of operation until such time as a user desires to further update the current Universal Coordinate Time value.

9. A method according to claim 1, further comprising:
   storing a current week sequence of bits derived from the only one subframe of said GPS navigation message.

10. A method according to claim 9, further comprising:
    activating said GPS signal receiver device to a full power mode of operation for another sufficient period of time to acquire only another single subframe of a GPS navigation message indicative of time correction parameters;
    processing the acquired another subframe of said GPS navigation message to update and display another current Universal Coordinated Time value having an increased accuracy;

deactivating said GPS signal receiver device to a low power standby mode of operation until such time as a user desires to further update the current Universal Coordinate Time value; and truncating said sufficient period of time when the subframe includes a specific week sequence of bits that corresponds to the current week sequence of bits stored in said GPS signal receiver device.

11. A system for determining a Universal Coordinated Time value, comprising:

a time calculating device for processing only one subframe of a GPS navigation message indicative of time correction parameters and for causing a current Universal Coordinated Time value to be updated and displayed for a user; and a user interface responsive to the user for activating said time calculating device to a full power mode of operation for a sufficient period of time to acquire the only one subframe of said GPS navigation message indicative of time correction parameters;

said time calculating device returning to a low power standby mode of operation for displaying time only after said time calculating device processes the only one subframe of a GPS navigation and causes the displaying of the updated Universal Coordinated Time value.

12. A time keeping device, comprising:

an encasement having a front face display for providing a user with a visual indication of time;

a lid mounted removably to the front face of said encasement for protecting said front face display, said lid having embedded therein a thin loop wire antenna for capturing GPS satellite signals;

a time calculating device coupled to said antenna for processing captured GPS satellite signals, said time a time calculating device for processing only one subframe of a single GPS navigation message indicative of time correction parameters and for causing a current displayed time value to be updated for visualization by a user; and a user interface responsive to the user for activating said time calculating device to a full power mode of operation for a sufficient period of time to acquire the only one subframe of said GPS navigation message indicative of time correction parameters;

said time calculating device returning to a low power standby mode of operation for displaying time only after said time calculating device processes the only one subframe of a GPS navigation and causes the displaying of the updated time value.

13. A time keeping device according to claim 12, wherein said time calculating device is a time and position calculating device.

14. A time keeping device according to claim 12, wherein said time calculating device process only the time relevant portions of the acquired GPS navigation message.

15. A time keeping device according to claim 13, wherein said time and positioning calculating device further processes satellite ephemeris information for determining user position information.

16. A time keeping device according to claim 15, further comprising:

a memory device coupled to said time and positioning device for storing the satellite ephemeris information to increase the accuracy of the displayed time value.

17. A time keeping device according to claim 14, wherein said time calculating device processes only the seconds portions of the acquired GPS navigation message.

18. A time keeping device according to claim 14, wherein said time calculating device recognizes repeated bit sequences in the GPS navigation message for improved power efficiency purposes.

19. A time keeping device according to claim 14, wherein said time calculating device includes a GPS receiver.

20. A time keeping device according to claim 19, wherein said GPS receiver can convert L1 GPS signals and L2 GPS signals.

21. A method of determining a Universal Coordinated Time value, comprising:

determining a sync time in response to a user initiating a request to acquire time;

activating a GPS signal receiver device at about said sync time from a low power standby mode of operation to a full power mode of operation for a sufficient period of time to enable a control processor to acquire a next available single subframe of time information from said single GPS satellite, said sufficient period of time being sufficient to acquire only 29 bits of said GPS navigation message indicative of time correction parameters and to process the acquired 29 bits of said GPS navigation message for updating a current Universal Coordinated Time value; and deactivating said GPS signal receiver device to said low power standby mode of operation.

22. A method according to claim 21, wherein said sufficient period of time is between about 0.03 seconds and about 6.0 seconds.

23. A method according to claim 21, wherein said sufficient period of time is substantially less than 6.0 seconds.

24. A method according to claim 23, wherein said sufficient period of time is substantially greater than 6.0 seconds when the user has traveled a significant distance from an original time acquisition location.

* * * * *